US007665574B2

(12) United States Patent

Schoela et al.

(10) Patent No.: US 7,665,574 B2

(45) Date of Patent: Feb. 23, 2010

(54) SOUNDPROOFING RESTRAINING SYSTEM

(75) Inventors: Egbert Schoela, Muellendorf (AT); Peter Seelmann, Vienna (AT); Ingulf Stuelpnagel, Vienna (AT); Johannes Kistenich, Brunnkirchen (AT); Ryoichi Tanaka, Chiba (JP); Motoji Tashiro, Chiba (JP)

(73) Assignee: Roehm GmbH & Co. KG, Darmstadt (DE)

( * ) Notice: Subject to any disclaimer, the term of this patent is extended or adjusted under 35 U.S.C. 154(b) by 154 days.

(21) Appl. No.: 10/495,426

(22) PCT Filed: Dec. 17, 2002

(86) PCT No.: PCT/EP02/14384

§ 371 (c)(1),
(2), (4) Date: Sep. 10, 2004

(87) PCT Pub. No.: WO03/060238

PCT Pub. Date: Jul. 24, 2003

(65) Prior Publication Data

US 2005/0023079 A1 Feb. 3, 2005

(30) Foreign Application Priority Data

Jan. 15, 2002 (DE) ................................ 102 01 411

(51) Int. Cl.
*B64F 1/26* (2006.01)

(52) U.S. Cl. ........................ 181/210; 181/285; 181/287; 181/289; 52/144; 52/145; 428/614; 428/67; 428/313.9

(58) Field of Classification Search ................. 181/210, 181/285, 287, 289; 52/144, 145, 786.11, 52/787.11, 790.11, 796.11, 799.12, 506.7, 52/515, 630; 428/614, 67, 313.9
See application file for complete search history.

(56) References Cited

U.S. PATENT DOCUMENTS

| | | | | |
|---|---|---|---|---|
| 5,154,117 | A * | 10/1992 | Didelot et al. | 100/155 G |
| 5,160,782 | A * | 11/1992 | Hickman | 442/18 |
| 5,372,866 | A * | 12/1994 | Oberlander et al. | 428/110 |
| 5,634,219 | A * | 6/1997 | Paredes et al. | 4/558 |
| 6,280,671 | B1 * | 8/2001 | Benz et al. | 264/172.14 |
| 6,305,492 | B1 * | 10/2001 | Oleiko et al. | 181/210 |
| 6,412,597 | B1 * | 7/2002 | Schola et al. | 181/290 |
| 2002/0195185 | A1 * | 12/2002 | Choi et al. | 152/527 |

FOREIGN PATENT DOCUMENTS

| | | |
|---|---|---|
| DE | 19947704 | 4/2000 |
| EP | 0559075 | 9/1993 |

* cited by examiner

*Primary Examiner*—Jeffrey Donels
*Assistant Examiner*—Forrest M Phillips
(74) *Attorney, Agent, or Firm*—Oblon, Spivak, McClelland, Maier & Neustadt, L.L.P.

(57) ABSTRACT

Soundproofing, restraining systems including at least one transparent acrylic glass panel that contains at least one embedded metal cable. A layer of plastic is provided, at least partially, between the surface of the metal cable and the transparent acrylic glass matrix. The restraining systems can be used in particular as noise barriers.

24 Claims, 2 Drawing Sheets

SOUNDPROOFING RESTRAINING SYSTEM

The present invention relates to sound-deadening retention systems, and also to their use as a noise barrier.

Transparent soundproofing units can be composed of transparent synthetic polymer sheets, which can be bonded to suitable fastening equipment to give soundproofing barriers. Transparent soundproofing units are increasingly used in areas where the noise-barrier installations have to be as inconspicuous as possible. This requirement applies particularly on bridges and towards the centres of built-up areas. These transparent noise barriers are in particular manufactured from polymethyl methacrylate (PMMA) or from PMMA-based moulding compositions, since this material has excellent transparency and optical properties, and also gives good sound deadening with good physicomechanical properties (stone impact resistance). DE-G 90 10 087.5 discloses the possibility of inserting threads of synthetic polymer into transparent synthetic polymer sheets. While the sheets constitute a single soundproofing unit, in the event of sheet fracture the threads of synthetic polymer retain the separate fragments and prevent them from falling away.

EP-A-0 559 075 moreover describes acrylic soundproofing units which comprise embedded spirals to prevent splintering of the noise barrier on fracture. The spaces within the spirals, which comprise steel springs, are in at least part of their cross section hollow or filled with a deformable medium, such as oil. The intention of these measures is that fragments arising on impact are held together. For the teaching of EP-A-0 559 075 it is significant that the spiral springs have a high degree of movement available within the synthetic polymer matrix. This high degree of available movement is ensured by the above-mentioned cavities.

EP-A-0 559 075 states in this connection that steel springs have a high modulus of elasticity. This means that even at low strain the tensile forces increase so rapidly that the ultimate tensile strength can be exceeded when the sheets fracture. The cavities described in EP-A-0 559 075 can be created by displacers which are removed after production of the sheets. In EP-A-0 559 075 there are no indications of a synthetic polymer layer arranged between the steel springs and the synthetic polymer matrix.

A particular disadvantage of an article in accordance with EP-A-0 559 075 is the high manufacturing cost of these acrylic sheets. For example, a displacer included in the casting process must first be carefully removed from the sheet before the resultant cavity can be filled, for example with oil. In addition, weathering generally causes rapid degradation of the oil. This can lead to impairment of the appearance of the soundproofing barrier. If the cavities are not filled with oil there is the risk of water penetration, and in particular in winter water can damage the barrier. If water which has penetrated the cavities freezes the result can be irreparable damage to the barrier.

In addition, in the abovementioned soundproofing barriers it is merely splintering of the noise barrier which is prevented. If a vehicle impacts a known acrylic sheet at high speed it generally punctures the noise barrier. It has to be borne in mind here that the high degree of movement available to the spiral springs can cause them to separate from the material. EP-A-0 559 075 describes no additional devices which could prevent separation from the material. However, devices of this type would have to have direct connection to the steel wires, creating the risk that water penetrates the cavities. Devices of this type would moreover have to be composed of high-specification metal and be of complicated design. A device of this type would therefore be complicated and very expensive.

This fracture behaviour of the noise barrier is not acceptable for many applications. In particular on bridges or in multi-storey car parks, puncture of the barrier on impact has to be avoided.

Bearing in mind the disadvantages described above and associated with a design based on EP-A-0 559 075, the prior art achieves this aim through additional retention systems, but these destroy the visual advantage, described above, of acrylic sheets over noise barriers composed of concrete. In addition, these additional systems imply high installation and maintenance costs.

In the light of the prior art stated and discussed herein, it was an object of the present invention to provide a sound-deadening retention system which has particularly low installation and maintenance costs.

Another object of the present invention was to provide an aesthetically attractive sound-deadening retention system which has particularly low production cost.

Another object on which the invention was based was to provide a retention system which does not impair, or impairs only to a very slight extent, the good aesthetic impression given by an acrylic noise barrier.

Another objective of the present invention was to provide sound-deadening retention systems which have particularly high weathering resistance.

The sound-deadening retention systems described in claim 1 achieve these objects, and also other objects which, although they are not specifically mentioned, are obvious or necessary consequences of the circumstances discussed herein.

Useful modifications of the retention systems of the invention are protected by the subclaims dependent on claim 1.

Claim 17 achieves the object set in relation to a use of the retention systems.

A transparent acrylic sheet which comprises at least one embedded metal cable, where between the surface of the metal and the transparent acrylic matrix there is, at least in part, a synthetic polymer layer, provides a surprising and not readily foreseeable method of providing a sound-deadening retention system with particularly low installation and maintenance cost. It has to be borne in mind here that an additional installation step becomes unnecessary, and unlike conventional retention systems, the noise barrier is practically maintenance-free.

The noise barriers of the present invention can moreover be produced simply and at low cost. The retention system integrated into the acrylic sheets has particularly high weathering resistance, since it is entirely surrounded by synthetic polymer.

For the purposes of the present invention, the term retention system means a device suitable for preventing an impacting article, such as a vehicle, from puncturing the device. In one preferred embodiment, a retention system of the invention can prevent an article impacting the system perpendicularly and having a velocity of at least 5, preferably at least 7, metres per second, and an energy of at least 5 000 joules, preferably at least 7 000 joules, from puncturing the system, thus effectively retaining the same.

The transparent acrylic sheets are known per se to the person skilled in the art. These sheets may be cast from methyl methacrylate syrup, for example. Typical sheet thicknesses are from 4 to 40 mm, preferably from 12 to 25 mm. The sheets are usually manufactured in a size of from 1.5 m×1 m to 2 m×3 m, and larger or smaller embodiments are also possible for specific applications.

The sheets are usually substantially transparent, preferably colourless or with a pale tint, e.g. smoke brown. The colourless, glass-clear transparent synthetic polymer sheets usually have a transmittance of at least 70%, and a transmittance of from 90 to 95% is advantageous. Tinted embodiments usually have a transmittance of from 45 to 75%, usually from 50 to 60%.

Any polymeric material may be used to produce the synthetic polymer layer, but the synthetic polymer layer has to be distinguishable from the acrylic matrix which surrounds the synthetic polymer layer. Preference is given to synthetic polymers which are incompatible with the acrylic material. Particularly suitable materials for producing the synthetic polymer layer are therefore polyamides, polyesters and/or polypropylene. The thickness of the synthetic polymer layer may vary within a wide range. However, the thickness is generally in the range from 50 μm to 1 mm, preferably from 100 μm to 500 μm, although no resultant restriction is intended.

For the purposes of the present invention, the term metal cable is to be interpreted widely. The metal cable may therefore be a monofilament wire. The cable may also be obtained by twisting two or more wires, making the metal cable a polyfilament.

The strength of the metal cable depends, inter alia, on the intended use of the noise barrier, and also on the number of cables present in the possible impact zone.

The metal cable generally has an ultimate tensile strength in the range from 1 000 N to 100 000 N, preferably from 1 500 N to 10 000 N, a modulus of elasticity in the range from 50 000 N/mm$^2$ to 1 000 000 N/mm$^2$, preferably from 80 000 N/mm$^2$ to 500 000 N/mm$^2$, and a tensile strength in the range from 50 000 N/mm$^2$ to 1 000 000 N/mm$^2$, preferably from 80 000 N/mm$^2$ to 500 000 N/mm$^2$, but no resultant restriction is intended. The mechanical properties are determined in accordance with the usual standards as set out and described by known institutes. These include the standards DIN EN 10002-1 and DIN 53 423.

The metal of which the cables are composed is not of critical significance. According to one particular embodiment of the present invention, the metal should have not only good mechanical properties but also high weathering resistance. Particularly suitable materials are therefore metal alloys which encompass iron, for example steel, which in a preferred embodiment is preferably stainless. The coefficient of thermal expansion of the metal should moreover be in the region of that of the synthetic polymer matrix, in order to avoid stresses attributable to temperature variations.

The cross sectional shape of the metal cable is not significant for the present invention. Use may therefore be made of cables with round, oval, rectangular or square cross section.

Depending on the desired strength of the metal, on the number of threads per unit area and the intended use, the cross-sectional area of the metal cable can vary over a wide range. The cross sectional area is generally, however, in the range from 0.3 mm$^2$ to 20 mm$^2$, from 0.8 mm$^2$ to 7 mm$^2$. A metal cable with a round cross section therefore has an approximate diameter in the range from 0.6 to 5 mm, preferably from 1 to 3 mm, but there is no intention that the invention be restricted thereto.

In one particular embodiment, the synthetic polymer layer has been applied to the metal cable. The production of this particular embodiment is particularly simple, since synthetic-polymer-coated metal cables merely have to be introduced in a known manner into a casting mould.

According to the invention, between the metal cable and the acrylic matrix there is, at least in part, a synthetic polymer layer. There can be a wide range of variation of the proportion covered by the synthetic polymer layer on the surface of the metal cable. At least 80%, preferably at least 90%, of the surface of the metal cable is generally covered. For the purposes of the invention, the interpretation of the term covering is as follows: that surface of the synthetic polymer layer which faces towards the metal cable is calculated to amount to at least 80% and, respectively, at least 90% of the surface of the metal cable excluding indentations resulting from cross-sectional shape, and 100% here represents complete sheathing of the metal cable. In accordance with the embodiment described above, therefore, the metal cable has not more than 20% of its surface, preferably not more than 10% of its surface, in contact with the acrylic matrix. In one particular embodiment, a synthetic polymer layer completely surrounds or sheaths the metal cable.

The forces for extraction of the steel wire from the acrylic matrix are generally greater than 50 N, preferably greater than 100 N, but no resultant restriction is intended. This force is determined in a known manner by applying forces to load free-lying metal cable. The minimum force needed to pull the cable out from the material is defined as the extraction force.

Depending on the intended use, the number of metal cables present in the acrylic sheet can vary over a wide range. For example, one metal cable of particularly high ultimate tensile strength oriented horizontally can suffice. However, two or more cables are generally inserted, optionally arranged parallel to one another. If the arrangement of the cables is horizontal, however, preference is then given to arrangements which provide non-uniform distribution of the cables, more cables being present towards the ground than at the upper margin of the sheet.

The arrangement of the metal cables may be in a straight line parallel to the surface of the acrylic matrix, or involve a deviation from a theoretical straight line through the ends of the cables.

This positioning of the metal cables with some degree of "sag" in the acrylic matrix leads under certain circumstances to more advantageous behaviour when sheets of the invention suitable as a noise barrier are subject to the relevant tests known to the person skilled in the art from the appropriate standards. For the purposes of the invention, maximum deviation means the greatest distance of the cable from a theoretical line drawn between the two ends of the respective cable.

The maximum deviation of a cable positioned with sag is generally at least 1 mm, preferably at least 3 mm and particularly preferably at least 5 mm.

This maximum deviation must not be permitted to cause the cable to lie outside the sheet: for the purposes of the invention actual embedding of the metal cables always has to be ensured. The maximum deviation, which for simplicity is also termed the deflection of the metal cable, cannot therefore be greater than the thickness of the sheet minus the diameter of the cable.

According to one embodiment of the invention, the deviation of the metal cable may be substantially perpendicular to the plane of the sheet. An example of a method of achieving this shape of the embedded cables is to use the action of gravity when embedding the cables into an acrylic moulding composition for the purposes of casting in a horizontal cell-casting process.

As an alternative to this embodiment, it can also be preferable for the deviation of the metal cables to be substantially parallel to the plane of the sheet. One method which inevitably gives rise to this type of embodiment of filament arrangement is casting of the sheets by what is known as the Rostero process. With the vertical cells usual according to that process, the action of gravity causes the cables to bend or hang parallel to the plane of the sheet.

Another advantageous embodiment of the sheets of the present invention provides a sheet comprising cables whose deviation is substantially perpendicular to the plane of the sheet and comprising cables whose deviation is substantially parallel to the plane of the sheet. An example of a method for obtaining this type of arrangement of the metal cables is to use two cables of different length so that one cable has a deviation parallel to the surface of the sheet, and the other cable has a deviation perpendicular to the plane of the sheet.

It is also possible for two 15 mm sheets with perpendicular and, respectively, parallel deviation with respect to the surface of the sheet to be adhesive-bonded together to give a sheet of thickness 30 mm, thus obtaining a sheet of the invention.

A particular case involves a metal cable embedded by rolling, with particularly advantageous fracture behaviour.

Depending on the procedure and on the production of the sheets of the invention, almost any desired orientation of the metal cables in the polymer matrix is therefore possible. For example, alongside a perpendicular or parallel arrangement with respect to the plane of the sheet it is also possible to achieve any desired degree of deviation between these boundaries.

According to the invention, the cables may run substantially parallel to one of the surfaces of the sheet.

The invention also permits the embedding into the polymer matrix of cables which do not run parallel to a surface but which, for example, have been embedded running perpendicularly.

This means that in relation to the first variant, in one particularly advantageous embodiment the cable ends of at least one cable are at substantially the same distance from one surface in the plane of the sheet and/or from one of the edges of the sheet. As long as the abovementioned condition has been fulfilled, the embedded cables are substantially parallel to one surface in the plane of the sheet and/or to one of the edges of the sheet.

As an alternative to this, in relation to the second variant, there can also be preferred embodiments in which the distance of the cable ends of at least one cable from one surface in the plane of the sheet and/or from one of the edges of the sheet is different.

Examples are used below, with reference to the attached figures, to provide a more detailed illustration of the particular embodiments described above of the present invention.

Figure 4A:
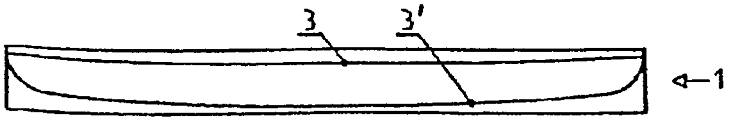

FIG. 4*a, b* show a cross section through a soundproofing unit with a fourth cable arrangement, and also a section along the line A-A in 4*a;*

Figure 5A:
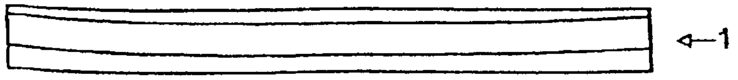

FIG. 5*a, b* show a cross section through a soundproofing unit with a fifth cable arrangement, and also a section along the line A-A in 5*a;*

Figure 6A:
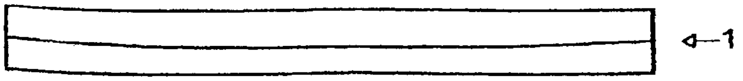

FIG. 6*a, b* shows a cross section through a soundproofing unit with a sixth cable arrangement, and also a section along the line A-A in 6*a;*

Figure 7:
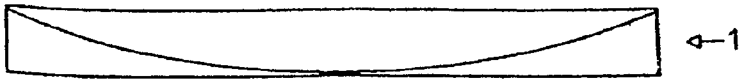
Figure 8:
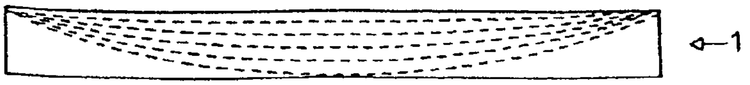
Figure 9:
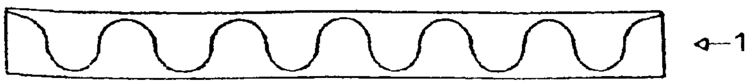
Figure 10:
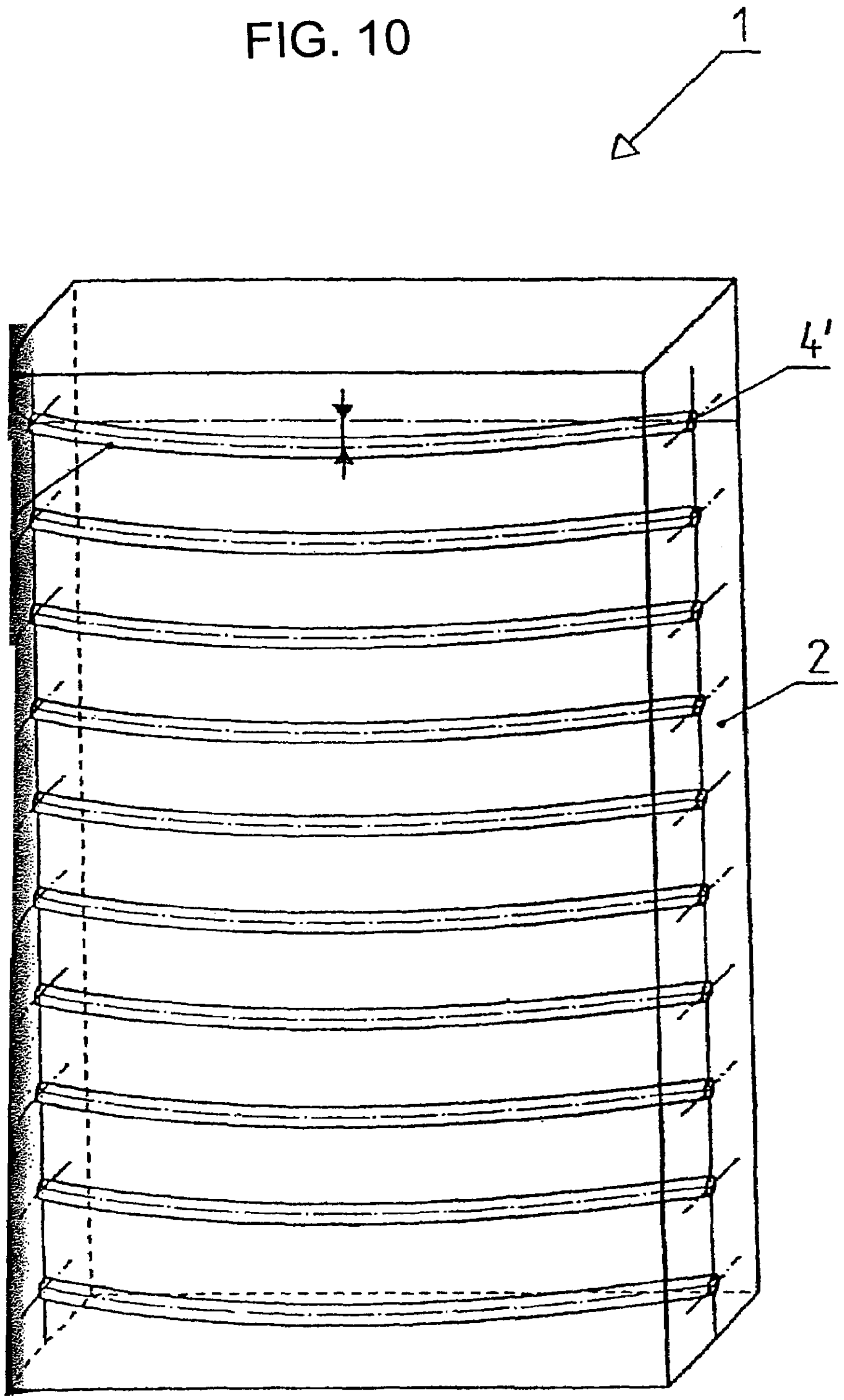

FIG. 7 shows a cross section through a soundproofing unit with a seventh cable arrangement;

FIG. 8 shows a cross section through a soundproofing unit with an eighth cable arrangement;

FIG. 9 shows a cross section through a soundproofing unit with a ninth cable arrangement; and FIG. 10 shows a perspective plan view of a sheet produced by the Rostero process with embedded metal cables whose deviation is perpendicular to the plane of the sheet.

The figures have been simplified by not showing the synthetic polymer layers provided between the acrylic matrix and the metal cables.

Figure 1:
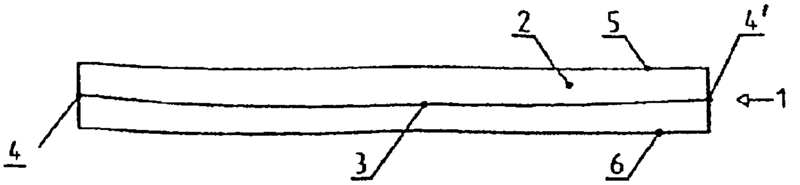
FIG. 1 shows a cross section through a soundproofing unit with a first cable arrangement.

In FIG. 1, the reference numeral 1 indicates an acrylic sheet with embedded metal cables provided at least to some extent with a synthetic polymer sheath. Reference numeral 2 indicates the polymer matrix, while reference numeral 3 indicates a metal cable. 4 and 4' identify the beginning and end of the cable. The distances of the beginning of the cable and end of the cable from the surface 5 are identical, as are the distances of the beginning of the cable and the end of the cable from the surface 6. It can be seen that halfway between the beginning 4 of the cable and the end 4' of the cable the filament 3 has a maximum deviation, i.e. departure from the theoretical connecting line, i.e. from the straight line between 4 and 4'.

Figure 2:
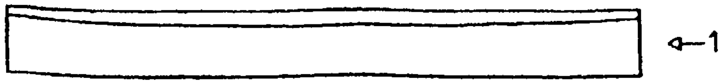
FIG. 2 shows a cross section through a soundproofing unit with a second cable arrangement.

In FIG. 2, another embodiment can be seen, and although this again shows an identical distance of 4 and 4' from the surface 5 and from the surface 6, the distances to the two surfaces 5 and 6 differ from one another. The cable shown is therefore not central, and is therefore not symmetrical, but instead the cable shown has been embedded asymmetrically.

Figure 3:
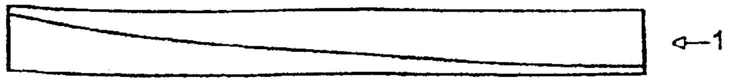
FIG. 3 shows a cross section through a soundproofing unit with a third cable arrangement.

The embodiment shown in FIG. 3 is a cable embedded "obliquely" into a polymer matrix and at least to some extent provided with a synthetic polymer sheath. A particular feature provided here is that the distance of the filament ends 4 and 4' of a filament from one and the same surface in the plane of the sheet (surface 5 or 6) is different.

Figure 4B:
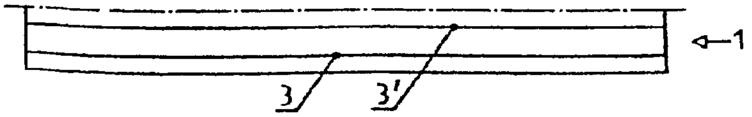

FIG. 4 provides evidence of another embodiment of the cable arrangements. This involves two visible embedded, at least to some extent synthetic-polymer-sheathed cables 3 and 3' which have an alternating arrangement. This means that the "sag" or "deviation" of one cable 3' is more marked than that of the other visible cable 3 illustrated. The two cables 3 and 3' illustrated may, of course, represent a series of filaments in the sheet. It is also clear that one of the cables may also have been embedded without any significant deviation or without any significant sag, while the second cable illustrated (reference 3') has relatively marked deviation from the normal lie. In FIG. 4*b*, the position of the cables 3 and 3' is further illustrated via a section along the line A-A in FIG. 4*a*.

Figure 5B:
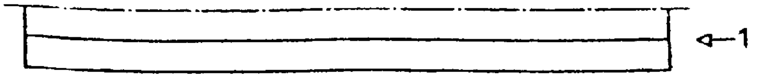

FIG. 5 shows yet another variant of the soundproofing units. This involves a multilayer arrangement of mutually superposed cables. These may have an arrangement with a directly mutually superposed sag, but the invention also includes multilayer embodiments with offset cables.

Figure 6B:

Like the preceding FIGS. 4*a, b* and 5*a, b*, FIG. 6 also shows not only a cross section but also a plan view of another embodiment of the inventive arrangement of metal cables provided at least to some extent with a synthetic polymer layer. It is clear from FIGS. 6*a, b* that a network arrangement of sagging filaments is also possible.

The maximum deflection of a cable provided at least to some extent with a synthetic polymer surface is clear from the cross section of another embodiment in FIG. 7. It is not more than the thickness of the sheet minus the thickness of the cable.

FIG. 8 gives another embodiment. It shows the cross section of an embodiment in which the deviation varies from filament to filament. For example, at a sheet thickness of about 20 mm the maximum deviation increases from 1 mm for the highest-tension cable to 19 mm for the cable with maximum deflection.

Another possible embodiment within the scope of the invention is clear from FIG. 9. A corrugated arrangement of the cable can be seen in cross section.

Finally, the embodiment depicted in FIG. 10 is one in which the arrangement of the embedded metal cable is such that their sag or maximum deviation runs parallel to the plane of the sheet. As indicated above, this type of arrangement of the filaments is readily obtainable from the Rostero process, for example.

According to another embodiment of the present invention, acrylic sheets also encompass filaments composed of synthetic polymer. This measure can improve splinter retention to an unexpectedly high extent.

The embedded threads composed of synthetic polymer are usually composed of a synthetic polymer incompatible with the polymer matrix of the acrylic sheet. Polyamide threads or polypropylene threads are suitable, for example. Preference is given to monofil threads, i.e. monofilaments. The threads usually run horizontally in the synthetic polymer sheet, since the sheets are clamped laterally. Coherence in the event of fracture is then particularly good. The threads are generally laid parallel to one another. If desired or required, two layers of threads can be introduced into the sheet, and these then preferably run in two directions, an angle of 90° between threads of different layers being particularly advantageous. This type of embodiment has the external appearance of a woven mesh.

However, it is also possible to embed the threads in such a way that at least one of the embedded threads has a maximum deviation of 1 mm or more from a theoretical straight line through the ends of the thread. This positioning of the metal cables with some degree of sag in the acrylic matrix leads under certain circumstances to more advantageous behaviour when sheets of the invention suitable as a noise barrier are subjected to the relevant tests known to the person skilled in the art from the appropriate standards. Reference is made here to the positioning of the steel cables in an arrangement with sag.

The orientation of the synthetic polymer threads may, inter alia, be parallel to the metal filaments. In one preferred embodiment, the threads composed of synthetic polymer and the metal cables form an angle in the range from 40° to 90°.

The sheets of the invention are used as a noise barrier, for example in multi-storey car parks, or else towards the centre of built-up areas, on bridges.

The invention is illustrated in more detail below by an example and a comparative example, but there is no intention that the invention be restricted to this example.

EXAMPLE 1

To produce an acrylic sheet, a cell was formed from 2×3 m sheets of polished silicate glass with the aid of a peripheral 20 mm gasket. Monofil polyamide threads with a diameter of 2 mm were clamped parallel to one another into this cell, each at a separation of 30 mm. At an angle of 90° to the polyamide threads, polyamide-coated steel cables were inserted. The steel cables had a modulus of elasticity of 10,000 kg/mm$^2$, a tensile strength of 170 kg and an ultimate tensile strength of 230 kg.

The cell was then filled with methyl methacrylate syrup which comprised a free-radical-generating initiator. The filled cell was placed in a water bath and the syrup was cured by introduction of heat to give a sheet of high-molecular-weight polymethyl methacrylate. The chamber was horizontal during polymerisation. After demoulding this gave a cast acrylic sheet of dimensions about 2×3 m and thickness 20 mm, with embedded polyamide-coated steel cables and polyamide threads. The forces for extraction of the steel wire from the matrix were greater than 100 N.

The resultant sheet was subjected to a pendulum test. The principle of carrying out this test is that a 300 kg steel weight is raised to 2.64 metres and used to break the sheet. The weight is composed of two butt-welded cone frusta. The impact velocity was 7.2 m per second, and the energy was 7776 joules.

Three sides of the sheets of dimensions 2×3 m were installed into a steel frame structure. At each corner of the sheet there is a hole at a distance of 15 cm serving to receive the fixing system, i.e. a steel cable secured to the frame structure is used and is passed through the four holes in the acrylic sheet. This method of construction corresponds to the normal installation of a transparent noise barrier. The side of the sheet had been provided with a rubber profile. The arrangement of the steel cables was horizontal.

The weight which impacts the acrylic sheet from a height of 2.64 m was used to break the sheet. However, it was significant that the impacter could not continue its swing past the retainer, but was retained.

COMPARATIVE EXAMPLE 1

Example 1 was substantially repeated. Although the steel cables used had the same mechanical properties, they had no polyamide sheath.

In the pendulum test, the pendulum continued its swing, and this acrylic sheet was therefore not capable of serving as a retaining system.

The invention claimed is:

1. A sound-deadening retention system comprising:

at least one transparent acrylic sheet having a top surface and a bottom surface, that includes a combination of at least one embedded metal cable and synthetic polymer threads; and a synthetic polymer layer between a surface of the metal cable and the transparent acrylic matrix, a surface of the synthetic polymer layer that faces the metal cable covers at least ninety percent of the metal cable, wherein the metal cable extends from a first end to a second end of the transparent acrylic sheet, wherein a distance between a first end of the metal cable and the top surface is different from a distance between a second end of the metal cable and the top surface, wherein an elevation of the metal cable sags at a middle portion thereof, wherein at least one synthetic polymer thread of the synthetic polymer threads has a maximum deviation of at least 1 mm from a theoretical straight line drawn between ends of the at least one synthetic polymer thread, and wherein a first and a second layer of synthetic polymer threads are included in the acrylic sheet, and the polymer threads in the first layer form an angle of 90° with respect to the polymer threads in the second layer, and the synthetic polymer threads and the metal cable form an angle of 45° with respect to one another.

2. A retention system according to claim 1, wherein the synthetic polymer layer is incompatible with the acrylic matrix of the sheet.

3. A retention system according to claim 2, wherein the synthetic polymer layer is composed of polyamide, polyester, and/or polypropylene.

4. A retention system according to claim 1, wherein a thickness of the synthetic polymer layer is in a range from 50 μm to 1 mm.

5. A retention system according to claim 1, wherein the metal cable has an ultimate tensile strength in a range from 1,000 N to 100,000 N.

6. A retention system according to claim 1, wherein the metal cable has a modulus of elasticity in a range from 50,000 $N/mm^2$ to 1,000,000 $N/mm^2$.

7. A retention system according to claim 1, wherein the metal cable has a diameter in a range from 0.6 mm to 3 mm.

8. A retention system according to claim 1, wherein the metal cable comprises iron.

9. A retention system according to claim 7, wherein the metal cable is composed of steel.

10. A retention system according to claim 1, wherein the metal cable is a monofilament.

11. A retention system according to claim 1, wherein the metal cable is a polyfilament.

12. A retention system according to claim 1, wherein the synthetic polymer layer has been applied to the metal cable.

13. A retention system according to claim 1, wherein the acrylic sheet comprises a plurality of metal cables arranged parallel to one another.

14. Use of a retention system according to claim 1 as a noise barrier.

15. A retention system according to claim 1, wherein the metal cable extends in a straight line widthwise from the first end to the second end of the transparent acrylic sheet.

16. A retention system according to claim 1, wherein the metal cable sags to a maximum deviation of at least 1 mm from a theoretical straight line drawn between the first end and the second end.

17. A retention system according to claim 1, wherein a second metal cable is embedded in the transparent acrylic sheet and extends from the first end to the second end of the transparent acrylic sheet, wherein an elevation of the second metal cable sags at a middle portion thereof, and wherein the sag of the second metal cable is greater than the sag of the at least one embedded metal cable.

18. A sound-deadening retention system comprising:

at least one transparent acrylic sheet that comprises a combination of at least one embedded metal cable and synthetic polymer threads; and a synthetic polymer layer between a surface of the metal cable and the transparent acrylic matrix, a surface of the synthetic polymer layer that faces the metal cable covers at least ninety percent of the metal cable, wherein the metal cable extends from a first end to a second end of the transparent acrylic sheet, wherein a distance between a first end of the metal cable and the top surface is different from a distance between a second end of the metal cable and the top surface, wherein an elevation of the metal cable at the first end is higher than an elevation of the metal cable at the second end, wherein at least one synthetic polymer thread of the synthetic polymer threads has a maximum deviation of at least 1 mm from a theoretical straight line drawn between ends of the at least one synthetic polymer thread, and wherein a first and a second layer of synthetic polymer threads are included in the acrylic sheet, and the polymer threads in the first layer form an angle of 90 degrees with respect to the polymer threads in the second layer, and the synthetic polymer threads and the metal cable form an angle of 45° with respect to one another.

19. A sound-deadening retention system comprising:

at least one transparent acrylic sheet that comprises a combination of at least one embedded metal cable and synthetic polymer threads; and a synthetic polymer layer between a surface of the metal cable and the transparent acrylic matrix, a surface of the synthetic polymer layer that faces the metal cable covers at least ninety percent of the metal cable, wherein the metal cable extends from a first end to a second end of the transparent acrylic sheet in a corrugated arrangement, wherein a distance between a first end of the metal cable and the top surface is different from a distance between a second end of the metal cable and the top surface, wherein at least one synthetic polymer thread of the synthetic polymer threads has a maximum deviation of at least 1 mm from a theoretical straight line drawn between ends of the at least one synthetic polymer thread, and wherein a first and a second layer of synthetic polymer threads are included in the acrylic sheet, and the polymer threads in the first layer form an angle of 90 degrees with respect to the polymer threads in the second layer, and the synthetic polymer threads and the metal cable form an angle of 45° with respect to one another.

20. A retention system according to claim 1, wherein synthetic polymer threads within a first layer of the two layers of synthetic polymer threads extend parallel to one another, and wherein synthetic polymer threads within a second layer of the two layers of synthetic polymer threads extend parallel to one another.

21. A retention system according to claim 18, wherein two layers of synthetic polymer threads are provided within the acrylic sheet.

22. A retention system according to claim 21, wherein synthetic polymer threads within a first layer of the two layers of synthetic polymer threads extend parallel to one another, and wherein synthetic polymer threads within a second layer of the two layers of synthetic polymer threads extend parallel to one another.

23. A retention system according to claim 19, wherein two layers of synthetic polymer threads are provided within the acrylic sheet.

24. A retention system according to claim 23, wherein synthetic polymer threads within a first layer of the two layers of synthetic polymer threads extend parallel to one another, and wherein synthetic polymer threads within a second layer of the two layers of synthetic polymer threads extend parallel to one another.

* * * * *